April 21, 1925.  
W. S. WELLS  
1,534,344  
DWELL MOTION MECHANISM  
Filed July 7, 1924
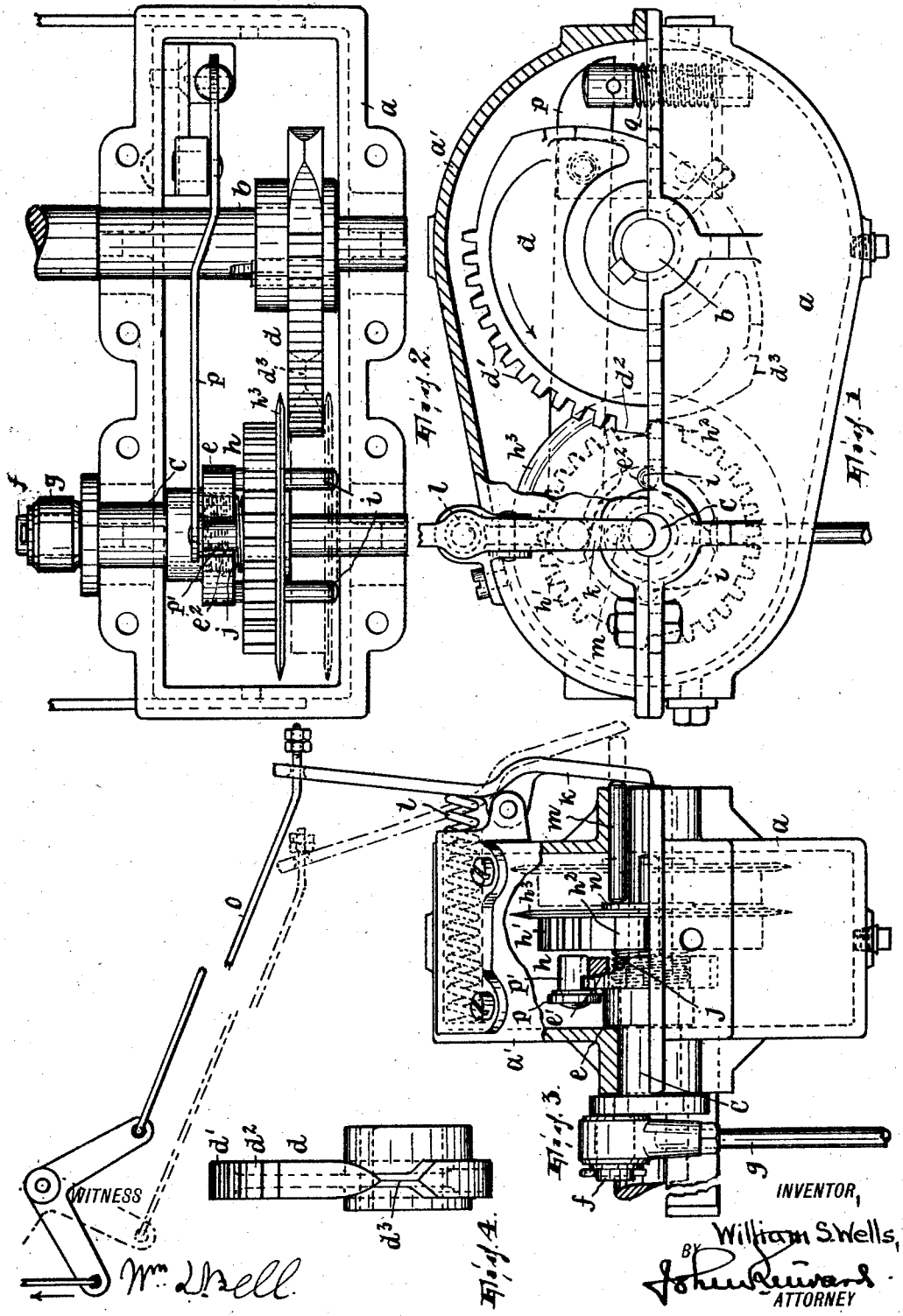

Patented Apr. 21, 1925.

1,534,344

UNITED STATES PATENT OFFICE.

WILLIAM S. WELLS, OF BETHLEHEM, PENNSYLVANIA, ASSIGNOR TO BENJAMIN EASTWOOD COMPANY, OF PATERSON, NEW JERSEY, A CORPORATION OF NEW JERSEY.

DWELL-MOTION MECHANISM.

Application filed July 7, 1924. Serial No. 724,598.

*To all whom it may concern:*

Be it known that I, WILLIAM S. WELLS, a citizen of the United States, residing at Bethlehem, in the county of Lehigh and State of Pennsylvania, have invented certain new and useful Improvements in Dwell-Motion Mechanisms, of which the following is a specification.

This invention relates to dwell-motion mechanisms for obtaining at different intervals of time, according to the requirements of a suitable pattern mechanism, the motion (usually first one way and then the other) of a structure to be moved, as the shuttle-box structure of a loom. For this purpose there are usually employed a driving rotary gear rotating at constant speed, a driven gear connected eccentrically, as by a pitman, with the structure to be moved and having spaced peripheral toothed segments, and pattern-controlled means to shift one of the gears laterally into and out of the plane of and hence into or out of position for meshing with the other gear. The object of this invention is to provide the gears with means which, during the whole extent of the period represented by the working part of the cycle of the driving gear, will insure against the laterally shiftable gear shifting from one to the other of its positions, which would produce a smash or jam, or assuming a partially shifted position, with consequent incomplete meshing of the gears and possible stripping of their teeth.

In the drawing,

Fig. 1 is a side elevation of the improved mechanism, with the upper part of the case in section;

Fig. 2 is a plan, with the upper part or cover of the case removed;

Fig. 3 is an end elevation, partly in section; and

Fig. 4 shows the driving gear, in edgewise elevation.

The case is formed in two counterpart halves $a$ $a'$, upper and lower, the upper part $a'$ of which may be here taken as the cover. This case receives the end portions of two shafts, $b$ and $c$, the former of which is the drive shaft and the latter the driven shaft.

On the drive-shaft is fixed a driving gear $d$ arranged eccentrically on the shaft and having a series of teeth at the extreme portion of its periphery which are set in an arc concentric to its axis; all the teeth $d'$ of this series are plain but one end one, $d^2$, is elongated as shown. Forward (in the direction of rotation of the gear-arrow, Fig. 1) of the teeth the gear has a switching portion which tapers forward to a knife-edge $d^3$, Fig. 4, that is here in the central plane of the gear.

On the shaft $c$ is fixed a collar $e$ which is recessed, at $e'$, at the front to form a housing and which has two opposite peripheral notches $e^2$. These are adapted to receive a holding device to be explained. The rear or exposed end of the shaft has a crank $f$ to which the pitman $g$ for imparting the motion to the box or other structure to be moved is pivotally connected. On the shaft $c$ is the driven gear $h$ having two opposite identically similar series of peripheral teeth; all the teeth $h'$ in each series are plain but one end one, $h^2$, is elongated as shown. The teeth of each of these series, it will be understood, are adapted to mesh with the teeth of the gear $d$; and the tooth $d^2$ is adapted to impinge against one or the other of the teeth $h^2$, it will be also understood, and since tooth $d^2$ coacts in this way with one of the teeth $h^2$ at a time when the driven gear is in a state of rest these teeth are all made longer so as to withstand the incidental shock. At its front side the gear $h$ has a peripherally projecting continuous flange or knife $h^3$ beveled to a knife-edge and flanking its teeth. Gear $h$ is in effect splined to shaft $c$ by two studs $i$ which project from collar $e$, parallel with the shaft, through the gear. The gear is normally urged to the front (right in Fig. 3) by a spiral spring $j$ contained in housing $e'$, in which position it would mesh with gear $d$; when shifted to the rear (Fig. 2) gear $h$ stands clear of the path of movement of gear $d$.

A lever $k$, subject normally to the pressure of a spring $l$ housed in the cover $a'_2$ of the case holds the gear $h$ in the position last stated, acting for this purpose through a sliding pin $m$, arranged in said cover, and a washer or wear-disk $n$ abutting the gear. This lever is connected with pattern mechanism (not shown) by the connection $o$.

The flange $h^3$ overlaps the teeth of the gear $d$ when the two gears mesh. Hence the gear $h$ can be shifted laterally only when the low part of gear $d$ adjoins the gear $h$.

Bearing on the periphery of collar $e$ is a roller $p'$ on a holding lever $p$ fulcrumed in the cover and subject to the pressure of a spring $q$. When the roller is seated in either notch $e^2$ the shaft $c$ will be held at standstill so long as the gears do not mesh.

Operation: According to the "call" of the pattern mechanism operating through connection $o$, the gear $h$ will be held either in position to be rotated by gear $d$ or out of such position (as in Fig. 2); and in the first position it will be turned a half-revolution at a time, thus to shift the box structure, and be held at dwell by the holding device $p$ between its movements. The extent of intervals or dwells between movements of gear $h$ will depend on the "call" of the pattern mechanism. The gear $h$, through any fault in the means controlling its position, cannot shift from one to the other of its positions (which would cause a smash or jam in the loom or other machine controlled) when the gear $d$ is approaching or is in the working part of its cycle, since the flange of gear $h$ then flanks the teeth of gear $d$; further, the gear $h$ cannot through any fault in the controlling means remain otherwise than fully in or fully out of register with gear $d$, since the switch $d^3$ will cam it one way or the other if it assumes a position intermediate its shifting limits. Thus there is no possibility of stripping the gears.

Having thus fully described my invention, what I claim as new and desire to secure by Letters Patent is:

1. A dwell-motion mechanism, including, with supporting means, a peripherally toothed driven rotary gear, an eccentric driving rotary gear having its axis parallel with that of the first gear and the high part of its periphery toothed and adapted to intermesh with the toothed periphery of the first gear, one gear being shiftable laterally into and out of the plane of the other to permit such intermeshing, and means to shift the shiftable gear into and out of said plane, the first gear having a peripherally projecting flange flanking its teeth and arranged to flank the teeth of the other gear and obstruct such shifting when in the rotation of the second gear the toothed high part thereof adjoins the first gear.

2. A dwell-motion mechanism, including, with supporting means, a peripherally toothed driven rotary gear, an eccentric driving rotary gear having its axis parallel with that of the first gear and the high part of its periphery toothed and adapted to intermesh with the toothed periphery of the first gear, one gear being shiftable laterally into and out of the plane of the other to permit such intermeshing, and means to shift the shiftable gear into and out of said plane, the first gear having a peripherally projecting flange flanking its teeth and arranged to flank the teeth of the other gear and obstruct such shifting when in the rotation of the second gear the toothed high part thereof adjoins the first gear, and the second gear having a switching portion rotatively in advance of its teeth and arranged to wipe laterally against said flange to cam the first gear laterally.

In testimony whereof I affix my signature.

WILLIAM S. WELLS.